FIG. 1
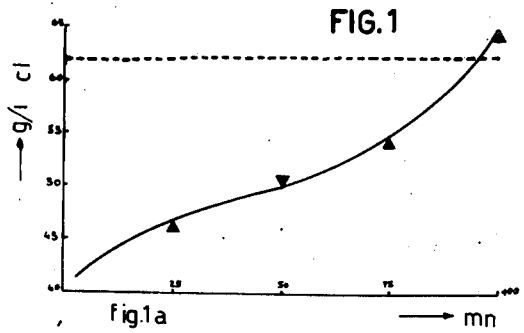
fig.1a
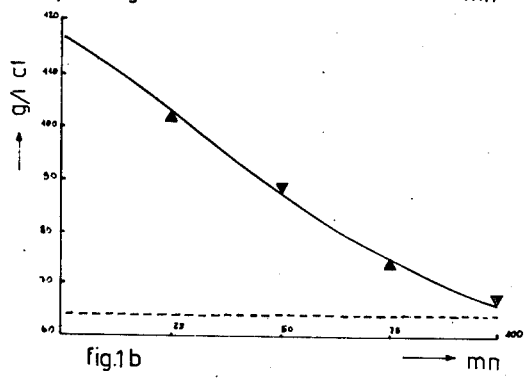
fig.1b
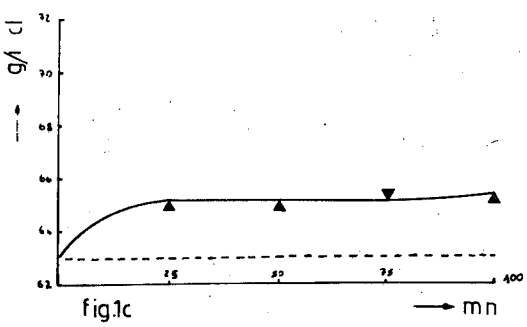
fig.1c
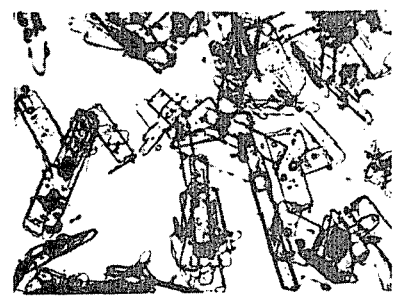
110 ×   a
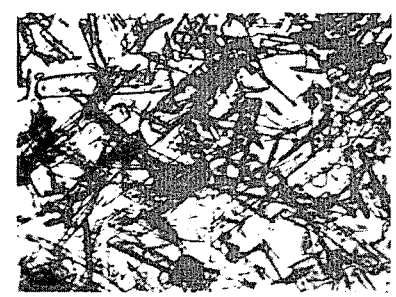
110 ×   b
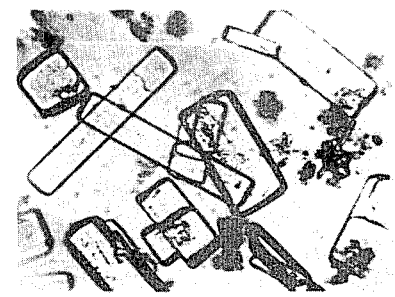
110 ×   c
110 ×
fig.1d

United States Patent Office 3,690,819
Patented Sept. 12, 1972

3,690,819
PROCESS FOR THE PREPARATION OF POTASSIUM NITRATE
Giacinto Veronica, 7 Via Dolores Bello, Novara, Italy
Filed June 1, 1970, Ser. No. 42,135
Claims priority, application Italy, May 22, 1969,
17,178/69
Int. Cl. C01b 21/48
U.S. Cl. 423—397                        6 Claims

ABSTRACT OF THE DISCLOSURE

Process for making $KNO_3$ from $KCl$ and $Ca(NO_3)_2$ salts, these salts being reacted in the presence of a recycle solution to form solid $KNO_3$, the recycle solution containing $Ca^+$, $K^+$, $NO_3^-$, and $Cl^-$ ions, separating the solid $KNO_3$ at a temperature from about $-10$ to $+20°$ C., and treating the mother liquor from which the $KNO_3$ has been precipitated with lime to thereby precipitate calcium oxychloride, $CaCl_2 \cdot 3CaO \cdot 16H_2O$, to thereby reduce the calcium chloride content of the mother liquor. Improvement comprises effecting the precipitation of calcium oxychloride in the presence of a solid phase made up substantially of calcium oxychloride and not more than 5% by weight of free lime at a temperature that is from from about 5 to 15° higher than the temperature of separation of the $KNO_3$, and maintaining the concentration of chloride ions of the liquid phase within $\pm 5$ grams per liter of the saturation concentration.

BACKGROUND OF THE INVENTION

(1) Field of the invention

The present invention relates to a process for the production of potassium nitrate. More particularly it relates to a process for preparing potassium nitrate from calcium nitrate and potassium chloride.

(2) Description of the prior art

It is known that one can obtain potassium nitrate starting from calcium nitrate and potassium chloride, as a solid phase in an equilibrium solution in water, according to the reaction:

(1) 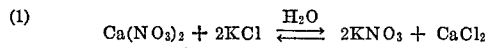

followed by the separation of the potassium nitrate at a temperature between $-10°$ and $+20°$ C., and preferably at about 0° C.

However, even when operating at this latter temperature, the yield in precipitated $KNO_3$ is only about 60%, and hence other operations must be carried out on the equilibrium solution in order to recover the remaining desired ions ($K^+$ and $NO_3^-$).

For effecting such a recovery several processes are known, such as, e.g., evaporation, or evaporation and precipitation of a double salt $(KNO_3 \cdot CaCl_2 \cdot 2H_2O)$, which is recycled (British Pat. 1,007,297), or the use of aliphatic alcohols which render the $KNO_3$ insoluble (German Pat. 606,385), etc.

According to German Pat. 572,722, in order to increase the separation yield of potassium nitrate the method to be followed is that of removing calcium chloride from the equilibrium solution. This is achieved by adding to said solution some calcium hydroxide, which will combine with $CaCl_2$ and will form a slightly soluble oxychloride, according to the reaction:

(2) 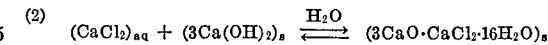

The equilibrium solution (1), after completion of reaction (2), is then capable of dissolving further calcium nitrate and potassium chloride to thus yield further potassium nitrate as a solid phase.

The oxychloride thus obtained is then decomposed in a subsequent stage with an excess of water, according to the reaction:

(3) 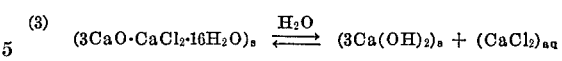

The lime obtained is recycled to (2), with the CaCl solution representing the waste product of the process.

Although the above process has been known for quite some time (1933), to date it has not proven to be of convenient application in industry, due to the fact that the oxychloride precipitates in the form of very thin needles and thus results in slurries having poor characteristics of decantability and filterability. After filtering, the oxychloride solid appears as a spongy mass that retains large quantities of the contact solution and retains useful salts (calcium nitrate and potassium chloride), so that it becomes necessary to use great volumes of washing water in order to recover these salts. Such washing results in an excess of water being introduced into the cycle as compared to the amount of water removed from the cycle (as water of hydration of the oxychloride and the hygroscopic $H_2O$ associated with the $KNO_3$), so that it is necessary to resort to evaporation, to the extent of 1 to 2 parts of evaporaed water for each part of obtained nitrate, according to German Pat. 572,722, mentioned previously. The necessity to evaporate, as well as the difficulty in handling a salt formed of fine crystals, render the process economically unprofitable.

SUMMARY OF THE INVENTION

The present invention provides a closed cycle for the preparation of potassium nitrate, according to the previously specified reaction sequence, however avoiding evaporation.

This invention also reduces to a minimum the requirement of thermal energy for heating or cooling of the system during the various stages of the process. Moreover, the invention ensures particularly high conversion yields, both in $K^+$ as well as in $NO_3^-$, obtained in the form of technical potassium nitrate with a titer not less than 96% with respect to the stoichiometric.

The invention also maintains substantially unaffected the above high yields, even when using raw materials of low purity, such as certain calcium nitrates and potassium chlorides of industrial production.

According to my invention, calcium chloride is precipitated from the mother liquor (containing $KNO_3$) as calcium oxychloride, $CaCl_2 \cdot 3CaO \cdot 16H_2O$, by the addition of lime, at a temperature of from 5 to 15° C. higher than the temperature employed in the separation of potassium nitrate, maintaining the chloride ion concentration in the liquid phase within a range of from $+5$ to $-5$ g./liter with respect to its saturation concentration, in the presence of a solid phase consisting of calcium oxychloride (obtained from previous processing) and of the minimum quantity of free lime at most, equal to 5% by weight of the solid phase).

In fact, it has been found that by operating under the above indicated conditions the oxychloride precipitates as coarse crystals, of a presmatic shape tending to a cubic shape, of a particle size of around 0.1 mm., easily decantable and readily separable from the mother liquor (by filtering or by centrifuging). A small quantity of washing liquid readily suffices for removing the useful salts adhering to the oxychloride crystals.

BRIEF DESCRIPTION OF THE DRAWING

My invention will be best understood from the following detailed description, taken in conjunction with the accompanying drawing, wherein:

FIGS. 1a, 1b, and 1c plot the chloride ion concentration for reaction (2) when operating at varying $CaCl_2$ concentrations with respect to the equilibrium concentration, with photographs a, b, and c, showing the nature of the resulting calcium oxychloride crystals;

FIG. 1d is a photograph of calcium oxychloride crystals obtained when employing a minor amount of a trivalent metal salt.

DESCRIPTION OF THE PREFERRED EMBODIMENTS

Figure 2:
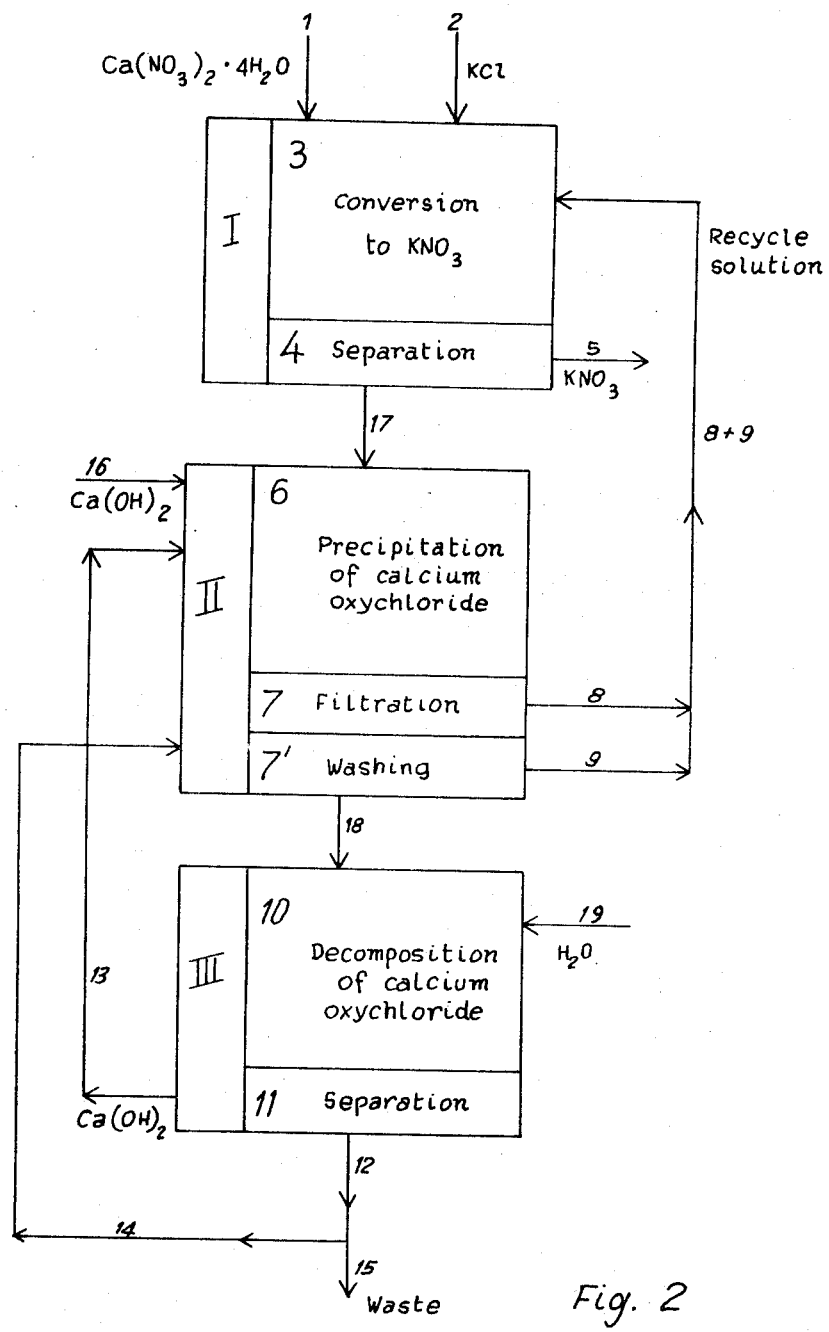
FIG. 2 is a schematic diagram illustrating the process of my invention.

Reaction (2) is conducted at a temperature from 5° to 15° C. higher than the temperature employed for reaction (1), the separation of potassium nitrate. In this way one avoids precipitation of potassium nitrate that would otherwise occur due to the removal of water from the liquid phase, this water removal being due to hydration of the oxychloride.

Such a crystallization would, obviously, involve a consumption of washing water much greater than the quantity of water necessary and sufficient for the removal of only the adhering lye. The rise in temperature on passing from reaction (1) to reaction (2) is spontaneous, due to the positive enthalpy of reaction (2), and therefore it is not necessary to provide external heat to obtain the above mentioned thermal temperature difference: on the contrary, sometimes it may be necessary to somewhat cool down the reaction temperature.

During the reaction one must avoid the occurrence of either appreciable oversaturation or undersaturation of $CaCl_2$ in the liquid phase, with respect to the concentration value foreseen by the equilibrium with the solid phase, $3CaO \cdot CaCl_2 \cdot 16H_2O$, at a given temperature.

The concentration at equilibrium also depends on the nature of the solid phase; in fact, a solid phase consisting of oxychloride and free lime permits a concentration of $CaCl_2$ in the liquid phase considerably lower than the concentration that would occur when the solid phase consisted substantially of only oxychloride. A concentration of from 60 to 70 g./liter in chloride ions in the mother liquor is sufficient for preserving the above indicated conditions for the whole temperature range from 10° to 20° C. at which the precipitation of the oxychloride is preferably carried out.

A preferred form of execution of reaction (2) is that of continuously introducing, as two separate streams, the lime and the liquid phase of reaction (1) inside a suspension in equilibrium according to (2), maintained at a constant temperature, and regulating the rate of addition of the reactants, so that the concentration of $CaCl_2$ in the liquid phase remains substantially constant with time. That is, it is preferred to meter the reactants in such a manner as to maintain the concentration of chloride ions essentially constant.

In any event, one operates in such a manner that said concentration will not differ by more than 5 g./liter from the saturation concentration. The three diagrams of FIG. 1 show the course of the concentration in chloride ions throughout reaction (2), when operating at 10° C., in conditions of concentration of $CaCl_2$, respectively lower than (FIG. 1a), greater than (FIG. 1b) and essentially equal to (FIG. 1c) that of equilibrium at 10° C. The equilibrium concentration at 10° C. is represented by the horizontal dotted line (63 g./liter of $Cl^-$).

The diagram reported in FIG. 1a was obtained starting from a suspension whose liquid phase was in equilibrium with calcium oxychloride at 10° C. To this was first added all the lime theoretically necessary for precipitating a certain quantity of $CaCl_2$, and thereupon the $CaCl_2$ solution was added over a time period of 100 minutes. The concentration of chloride ions increases gradually up to reaching 65 g./liter. The calcium oxychloride crystals obtained are represented by photograph a and are quite fine.

The diagram of FIG. 1b was obtained by adding to a suspension, the liquid phase of which was in equilibrium with oxychloride, first all the $CaCl_2$ and then by gradually adding lime, still at 10° C. and over a period of 100 minutes. The crystals are even finer than in the previous case. (See photograph b.)

The diagram of FIG. 1c was obtained by adding to the solution, having its liquid phase in equilibrium with oxychloride, contemporaneously and gradually the $CaCl_2$ solution and the lime, in stoichiometric quantities, and keeping close to the pre-existing equilibrium conditions. Thereby there were obtained large crystals, as shown by photograph c.

According to the present invention, I have found that one may add to the solution small quantities (0.1–0.3 g./liter calculated as oxides) of trivalent metal salts of such metals as Al, Fe, Cr. etc., preferably in the form of metal nitrates. Indeed, oxychloride crystals obtained in the presence of such salts in the solution tend more towards a cubic shape, since there is favored the development of face 010 to the detriment of face 100, as may be seen from the photograph d, which shows said crystals.

As appears from a comparison between photograph d and photograph c, crystals obtained in the presence of trivalent metal salts turn out to be larger and more cubic than those crystals obtained in the absence of such trivalent metal salts.

Reaction (3) is carried out without any external addition or removal of heat. The reaction is conducted along the same principles illustrated in connection with reaction (2), that is, by feeding the oxychloride and the water inside an equilibrium slurry with a solid phase of $Ca(OH)_2$, using such flow rates and such ratios as to maintain substantially constant the conditions of the equilibrium itself.

In this way one obtains a well crystallized lime, with the advantage of a smaller requirement in water for the cycle, because its water content is only about 25–30% as against that of about 50% for normal slaked lime. Moreover, the use in reaction (2) of well crystallized lime reduces the solid-liquid exchange surfaces, on whose interface the reaction occurs, reducing in proportion the number of nuclei of oxychloride produced in a given time unit. However, it is desirable that the particle size of the lime should not exceed 0.2 mm., so as not to excessively retard reaction (2).

The process of this invention will now be described in further detail, with respect to a preferred embodiment, and with reference to FIG. 2.

FIG. 2 schematically illustrates the process of this invention. The reaction is carried out in three stages, identified by reference characters I, II, and III, respectively.

Stage I: To a recycle solution 8+9 (described in greater detail hereinafter), this recycle solution containing primarily $Ca^{++}$, $K^+$, $NO_3^-$ and $Cl^-$ ions, and being withdrawn from Stage II and added to zone 3 of Stage I, were added, via lines 1 and 2, respectively, calcium nitrate and potassium chloride in such amounts and proportions as to result in the formation of a solid phase consisting substantially of $KNO_3$. The solid $KNO_3$ is separated in zone 4, as by filtration or by centrifugation, and is then discharged via line 5. The liquid phase passes via line 17 into Stage II. If desired, one can subject the separated solid to washing and then add the washings to the mother liquor of the $KNO_3$, as by adding such washings to the liquid phase in line 17.

Since, ordinarily calcium nitrate is introduced in the form of the tetrahydrate, the volume of the resulting liquid phase is greater than that of the starting recycle solution, primarily because of the addition of water from the tetrahydrate.

The mixture of Stage I may be prepared from hot reactants, but it must then be cooled down in order to obtain a satisfactory yield upon separation of the $KNO_3$, taking into consideration its high thermal coefficient of solubility. A temperature of from $-10°$ to $+20°$ C., and preferably between $0°$ and $10°$ C., has been found to be most satisfactory.

If the calcium nitrate employed has been obtained as a result of treatment of phosphate rocks with $KNO_3$ followed by separation of calcium nitrate by cooling (e.g., Odda process or the like), it thus contains impurities such as phosphorus and fluorine (which impurities, upon passing into the subsequent stage, would hinder the regular growth of the oxychloride crystals). In such case, the first stage of the process is modified in the sense that initially there is added only calcium nitrate. This dissolves completely (without the need of heating), and the resulting solution is then treated with that quantity of lime necessary for precipitating the above mentioned impurities, which are then eliminated by filtering. To the resulting clear solution is then added potassium chloride. It is possible to use KCl of a technical grade (60%–62% $K_2O$) wherein the chief impurity is NaCl. Once the operational conditions are attained, the sodium ion is substantially eliminated together with the calcium chloride discharge solution via line 15, so that the potassium nitrate will not contain more than 0.2–0.3% by weight of $Na_2O$.

Stage II: Solution 17, coming from Stage I together with washing water, if any, from the washed $KNO_3$, is admixed in zone 6 with lime which enters . . . via line 13 (from the decomposition of the oxychloride carried out in Stage III), along with a small additional quantity of lime via line 16 in order to balance out losses due to solubilization. The total quantity of lime is adjusted, according to the stoichiometry of reaction (2), to the quantity of the new $CaCl_2$ originated in Stage I, which corresponds to the $KNO_3$ produced. It is desirable to operate in such a manner that the free lime, after precipitation, does not exceed 5% by weight of the solid phase of calcium oxychloride that is formed.

The quantity of water of hydration of the oxychloride is such as to counterbalance the water introduced into the cycle (1) with the calcium nitrate, (2) with the lime, and (3) with the washings.

In order to reduce the washing of the oxychloride, it is essential that this intermediate salt be obtained in the form of well developed crystals that retain relatively little of the contact solution; otherwise, by limiting the washing water in order to balance the cycle, one would encounter too large a loss of useful ions that had remained adhering to the oxychloride.

Operating according to the previously described conditions, the precipitation of the oxychloride is completed in from about 1 to 3 hours. Thereafter the resulting slurry is fed to a thickener. Thereupon the settled salt is separated, as by filtering or, preferably, by centrifuging as in zone 7, and is then washed in zone 7' with a portion (via line 14) of the exhaust solution (via line 12) which is withdrawn from Stage III.

A preferred embodiment for washing comprises introducing a part of the washing liquid into the settled slurry to be centrifuged, the remaining part of liquid being then sprayed on the salt gathered in the centrifuge. The liquid phase obtained in this stage (recycle water 8+9, consisting of the mother liquor 8 from the precipitation of the oxychloride plus the washing water 9) is returned to Stage I.

Stage III: The solid phase is withdrawn from Stage II via line 18, and is decomposed in zone 10 with water that is added via line 19, preferably at room temperature and in such quantity as to obtain an equilibrium solution. This equilibrium solution, after a contact time of from about 1 to 3 hours, is discharged via line 12 and desirably has a content of from 80 to 100 g./liter of $CaCl_2$. If required, it is, however, also possible to obtain more concentrated solutions, either by increasing the temperature, or at room temperature, by first carrying out a decomposition in the presence of a solid phase of lime and oxychloride, and then by completing separately the decomposition. Solid $Ca(OH)_2$ is separated from the $CaCl_2$ solution in zone 11.

A portion of the solution in line 12 thus obtained serves for the washing of the oxychloride, via line 14. The remaining portion of the solution is discharged through line 15, and is considered as waste with respect to this process. It contains the foreign salts adhering to the oxychloride along with virtually all of the calcium chloride present therein; moreover, it is essentially saturated with

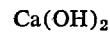

$$Ca(OH)_2$$

with a content of about 2 g./liter at room temperature. Said solution removes the $K^+$ and $NO_3^-$ ions not recovered in the process, as an average in the proportion of from 3% to 4% and from 5% to 6%, respectively, with respect to the starting reactants, KCl and $Ca(NO_3)_2$.

The yields amount to 96–97% in $K^+$ and to 94–95% in $NO_3^-$. Slightly lower yields may be obtained where it has been necessary to initially purify the calcium nitrate used, although the small quantities of $K^+$ and $NO_3^-$ ions removed during such purification may be utilized at another point, for instance, in the nitric acid treatment of phosphate rocks to form the initial calcium nitrate.

In order to further illustrate this invention, the following illustrative examples are given. All parts are by weight unless otherwise stated.

EXAMPLE 1

The initial solution withdrawn in line 17, this solution amounting to 1000 liters or 1340 kg., was obtained in the separation at $0°$ C. of solid $KNO_3$. The solution was of the following composition:

216.5 g./liter of $CaCl_2$, 116 g./liter of $Ca(NO_3)_2$ and 150 g./liter of $KNO_3$. This solution was fed in 2 hours into a slurry, the liquid phase of the slurry being in equilibrium with solid oxychloride (the liquid phase of the slurry contains: 113 g./liter of $CaCl_2$; 182 g./liter of $Ca(NO_3)_2$; 164.5 g./liter of $KNO_3$; and 5–10 g./liter of minor constituents), maintained at $10°$ C., together with a mixture of 375 kg. of recycle lime [$Ca(OH)_2$ content: 70.5%] and 11 kg. of make-up lime [$Ca(OH)_2$ content: 50%].

The mixture of recycle lime and make-up lime is fed as suspension into solutions coming from the filtering of previously precipitated oxychloride, of other preparations of $KNO_3$ and having the above-said equilibrium composition (1 part by weight of lime in 1.5 parts by weight of solution).

The lime suspension was maintained at $15°–20°$ C. in order to avoid reactions between the two phases.

During the precipitation of the oxychloride it is necessary to eliminate part of the heat due to the exothermic nature of the reaction, which can be economically carried out by exploiting the endothermic nature of the decomposition reaction. Once the precipitation of the oxychloride had been completed, the slurry was decanted and centrifuged, and the thickened slurry was then washed in zone 7' (FIG. 2).

In this manner, from the 1000 liters of solution withdrawn via line 17, there were obtained, 1125 kg. (875 liters) of recycle solution (via lines 8+9) having the same composition as that of the liquid phase of said slurry, and 772 kg. of oxychloride having the following percent composition by weight; $CaCl_2 = 17.05\%$;

$$Ca(NO_3)_2 = 0.9\%$$

$KNO_3 = 0.8\%$; $Ca(OH)_2 = 36.5\%$; $H_2O = 46.1\%$.

The 875 liters of recycle solution (lines 8+9) were recycled to zone 3, the temperature being maintained at 10° C., and there were added 272 kg. of pure $$Ca(NO_3)_2 \cdot 4H_2O$$

and 161 kg. of pure KCl, via lines 1 and 2, respectively. In order to speed up the reaction of double salt exchange, mild heating was effected, up to about 15–20° C. On cooling down the slurry to 0° C. and one separating the precipitated $KNO_3$, there were obtained 1308 kg. (955 liters) of solution (withdrawn via line 17) and 250 kg. of salt. This salt had the following composition, expressed as weight percent: Cl=1.3; Ca=1.7; $K_2O$=41.0;

$$NO_3 = 57.1$$

$H_2O$=5.6. Upon washing the salt with 30 kg. of water, its composition was expressed as weight percent: Cl=0.7; Ca=1.0; $K_2O$=43.0; $NO_3$=58.5; $H_2O$=4.0, which corresponds to 96.5% $KNO_3$ on a dry basis.

The washing solution (45 liters) added to the 955 liters of the mother liquor at 0° C., restores the volume and composition of the initial solution. The oxychloride was decomposed with about 1200 kg. of water, resulting in 375 kg. of lime for recycle and about 1400 liters of waste solution (withdrawn via line 12) of which 140 liters were used for the washing of the oxychloride.

The conversion yield in $KNO_3$ amounted to 97.2% for $K^+$ and 94.7% in $NO_3^-$.

The precipitated calcium oxychloride showed substantially a cubic shape and had the following size distribution:

| | Percent |
|---|---|
| Above 0.25 mm. | 9 |
| From 0.25 to 0.15 mm. | 15.9 |
| From 0.15 to 0.09 mm. | 38.9 |
| From 0.09 to 0.06 mm. | 10.2 |
| Less than 0.06 mm. | Balance |

EXAMPLE 2

The precipitation of the oxychloride was carried out under similar conditions as described for Example 1, with the difference that the recycle solution used (withdrawn via lines 8+9) contained also a small quantity of aluminum nitrate, namely, 0.24 g./liter expressed as $Al_2O_3$. The lime used consisted of 368 kg. of recycle (via line 13) [71.5% lime, the remainder being water] and of 33 kg. of make-up (via line 16) [50% lime]. The oxychloride thus obtained, after washing with 120 liter of waste solution (via line 14), weighed 785 kg. and showed the following composition, expressed as weight percent:

$$CaCl_2 = 17.9$$

$Ca(NO_3)_2$=0.5; $KNO_3$=0.4; $Ca(OH)_2$=35.9;

$$H_2O = 45.0$$

It showed the particle size distribution:

| | Percent |
|---|---|
| Above 25 mm. | 2.3 |
| From 0.25 to 0.16 mm. | 15.0 |
| From 0.16 to 0.09 mm. | 44.1 |
| From 0.09 to 0.06 mm. | 16.7 |
| Less than 0.06 mm. | Balance |

The liquid phase 8 in equilibrium with the above mentioned oxychloride, together with the washing liquid 9, forms the recycle water (via lines 8+9); this amounts to 1105 kg. (855 liters) and shows a composition in g./liter of: $CaCl_2$=101; $Ca(NO_3)_2$=190; $KNO_3$=172; lime and other minor constituents=7.5 and $H_2O$=821.

In the above mentioned solution (8+9) were dissolved at 10° C. 317 kg. of calcium nitrate (resulting from the treatment of phosphate rock with nitric acid) and having the following composition, expressed in weight percent: $Ca(NO_3)_2$=63.8; free $HNO_3$=2.0; $P_2O_5$=1.0; F=0.25; $H_2O$=31.5. To the resulting solution were then added 13 kg. of recycle lime for the precipitation of the impurities which were gathered as 38 kg. of a precipitate of the following composition expressed as weight percent: Ca=14.3; Cl=3.9; $K_2O$=4.0; $NO_3$=13.2; $P_2O_5$=8.1; F=1.0; $H_2O$=50.0.

After filtering the above mentioned precipitate, there were added to the filtrate 188 kg. of technical KCl (titre: 97 weight percent KCl; main impurity=NaCl). After having carried out the double-exchange reaction, the slurry was cooled down to 0° C., and the potassium nitrate (258 kg.) was separated and washed (with 35 kg. of water), and showed the following composition, in weight percent: Ca=0.5; Cl=1.2; Na=0.3; $K_2O$=42.8; $NO_3$=58.1; $H_2O$=4.2, corresponding to 96.1% of $KNO_3$ on a dry basis.

The liquid phase 17 thus obtained (equilibrium solution at 0° C. plus washing) corresponded in composition and quantity to the initial solution from which the process was commenced. The yield amounted to 95.3% in $K^+$ and 93.6% in $NO_3^-$. These yields do, however, increase to, respectively, 96.5% and 96.7%, where one uses the precipitate obtained in the purification, for instance, by recycling it back to that initial stage of the process wherein the calcium nitrate is obtained.

The oxychloride was decomposed with about 1300 kg. of water, thereby obtaining 381 kg. of lime [$Ca(OH)_2$ content: 71.5%] and 1700 kg. of waste solution (withdrawn via line 12).

Modifications and variaitons can, of course, be made without departing from the spirit and scope of the invention.

Having thus described my invention, what I desire to secure by Letters Patent and hereby claim is:

1. In a process for making $KNO_3$ from KCl and $Ca(NO_3)_2$ salts, said salts being reacted in a reaction zone in the presence of a recycle solution to form solid $KNO_3$, said recycle solution containing $Ca^{++}$, $K^+$, $NO_3^-$, and $Cl^-$ ions, separating said solid $KNO_3$ at a temperature from about −10 to +20 degrees C., treating the mother liquor from which said $KNO_3$ has been precipitated with lime to thereby precipitate calcium oxychloride, $$CaCl_2 \cdot 3CaO \cdot 16H_2O$$

to thereby reduce the calcium chloride content of said mother liquor, separating said precipitated calcium oxychloride from said mother liquor, and recycling the thus obtained recycle solution to said reaction zone, the improvement comprising effecting said precipitation of calcium oxychloride in the presence of a solid phase made up substantially of calcium oxychloride and not more than 5% by weight of free lime at a temperature that is from about 5 to 15 degrees C. higher than the temperature of separation of the $KNO_3$, and maintaining the concentration of chloride ions of the liquid phase within ±5 grams per liter of the saturation concentration.

2. The process of claim 1, wherein said separation of $KNO_3$ is effected at a temperature of from about 0 to 10° C.

3. The process of claim 1, wherein said precipitation of oxychloride is effected at a temperature of from about 10 to 20° C. and with a concentration of chloride ions in the liquid phase of from 60 to 70 grams per liter.

4. The process of claim 1, wherein to the solution from which is precipitated said oxychloride there is added a trivalent metal salt wherein the trivalent metal is Al, Fe, or Cr, said salt being present in an amount of from about 0.1 to 0.3 g./liter, expressed as the corresponding metal oxide.

5. The method of claim 4, wherein said trivalent metal salt is a nitrate.

6. The process of claim 1, wherein the source of said $Ca(NO_3)_2$ is impure due to the presence of $PO_4^{\equiv}$, $F^-$, $SiF_6^=$, or $Mg^{++}$ ions, and wherein said source is treated, prior to reaction with KCl, with lime to thereby precipitate said ions.

References Cited

UNITED STATES PATENTS

| | | | |
|---|---|---|---|
| 2,594,723 | 4/1952 | Berteaux | 23—295 |
| 3,361,522 | 1/1968 | Fiatt | 23—102 |

FOREIGN PATENTS

| | | |
|---|---|---|
| 572,722 | 3/1933 | Germany. |

OSCAR R. VERTIZ, Primary Examiner

G. A. HELLER, Assistant Examiner

U.S. Cl. X.R.

423—472; 23—304